(12) United States Patent
Bonsack

(10) Patent No.: US 9,599,826 B2
(45) Date of Patent: Mar. 21, 2017

(54) BOTTLE KALEIDOSCOPE

(71) Applicant: Gerald A. Bonsack, Onalaska, WI (US)

(72) Inventor: Gerald A. Bonsack, Onalaska, WI (US)

( * ) Notice: Subject to any disclaimer, the term of this patent is extended or adjusted under 35 U.S.C. 154(b) by 0 days.

(21) Appl. No.: 15/078,096

(22) Filed: Mar. 23, 2016

(65) Prior Publication Data

US 2016/0357022 A1    Dec. 8, 2016

Related U.S. Application Data

(60) Provisional application No. 62/283,966, filed on Sep. 17, 2015, provisional application No. 62/230,474, filed on Jun. 8, 2015.

(51) Int. Cl.

| | |
|---|---|
| *G02B 27/08* | (2006.01) |
| *G02B 17/00* | (2006.01) |
| *G02B 5/09* | (2006.01) |
| *G02B 7/182* | (2006.01) |

(52) U.S. Cl.
CPC .............. *G02B 27/08* (2013.01); *G02B 5/09* (2013.01); *G02B 7/182* (2013.01); *G02B 17/004* (2013.01)

(58) Field of Classification Search
CPC ...................................... G02B 27/08
USPC ................................. 359/616–617
See application file for complete search history.

(56) References Cited

U.S. PATENT DOCUMENTS

| | | | |
|---|---|---|---|
| 1,414,469 A | 5/1922 | House | |
| 2,475,930 A * | 7/1949 | Wesley | ................... G09F 19/18 353/2 |
| 2,484,116 A * | 10/1949 | Papke | ..................... A63J 15/00 359/617 |
| 3,501,217 A | 3/1970 | Bottani | |
| 4,077,706 A * | 3/1978 | Yaeger | .................. G03B 21/00 353/1 |
| 4,740,046 A | 4/1988 | MacCarthy | |
| 4,776,653 A | 10/1988 | Kaplan | |
| 5,131,734 A | 7/1992 | Hausner | |
| 5,469,297 A | 11/1995 | Marshall et al. | |

OTHER PUBLICATIONS

Ephrem; Ephrem's Bottle Cutter; http://www.ephremsbottlecutter.com/; Publication Date: Apr. 28, 2012.

(Continued)

*Primary Examiner* — Christopher Mahoney
(74) *Attorney, Agent, or Firm* — www.bobharter.com; Robert J. Harter

(57) ABSTRACT

A kaleidoscope is made by installing a kit of parts within a beverage bottle that has been altered by cutting off the bottom of the bottle. The kit includes multiple lens systems and reflective tubes that are sized, shaped and arranged to create a dazzling composite image. In some examples, the composite image includes a multifaceted reflection of an assortment of viewable items plus a halo-distortion of the items encircling the multifaceted reflection. In addition to collecting ambient light directly from an axial direction, the kaleidoscope collects reflected light from multiple radial directions as directed by a multifaceted light-gathering reflector surrounding a transparent object container that contains the viewable items.

20 Claims, 4 Drawing Sheets

(56) References Cited

OTHER PUBLICATIONS

Cape Cod Beer; Beer Kaleidoscope; http://capecodbeer.com/brewery/beer-bottle-kaleidoscopes/; Publication Date: Jun. 23, 2011.
Nellie Bly; Nellie Bly Kaleidoscopes; http://shop.nellieblyscopes.net/Champagne-Bottle-Kaleidoscope-k672.htm; Publication Date: Apr. 2, 2015.
Sam; Kaleidoscopes by Sam Sidders; http://ssidders.tripod.com/id21.htm; Publication date: Mar. 21, 2016.
Kaleidoscopeshop; Kaleidoscope Shop; http://www.kaleidoscopeshop.com/; Publication Date: admitted prior art Mar. 21, 2016.

* cited by examiner

BOTTLE KALEIDOSCOPE

CROSS REFERENCE TO RELATED APPLICATIONS

This application claims the benefit of both provisional patent application 62/230,474 filed on Jun. 8, 2015 and provisional patent application 62/283,966 filed on Sep. 17, 2015; both of which are specifically incorporated herein by reference.

FIELD OF THE DISCLOSURE

The present disclosure relates to optical devices and more specifically to kaleidoscopes.

BACKGROUND

A kaleidoscope is an optical instrument for viewing a repetitive geometric image created by multiple reflections of an assortment of viewable items, such as loose pieces of colorful glass, plastic, etc. The loose pieces are usually contained within a rotatable chamber while a user views the items through a triangular or other multifaceted tubular mirror.

DETAILED DESCRIPTION

Figure 7:
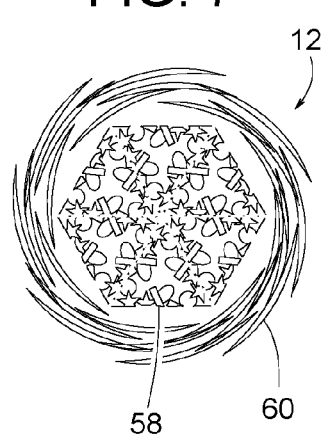
FIG. 7 is a top view of an example image created by the kaleidoscope shown in FIG. 1.
Figure 8:
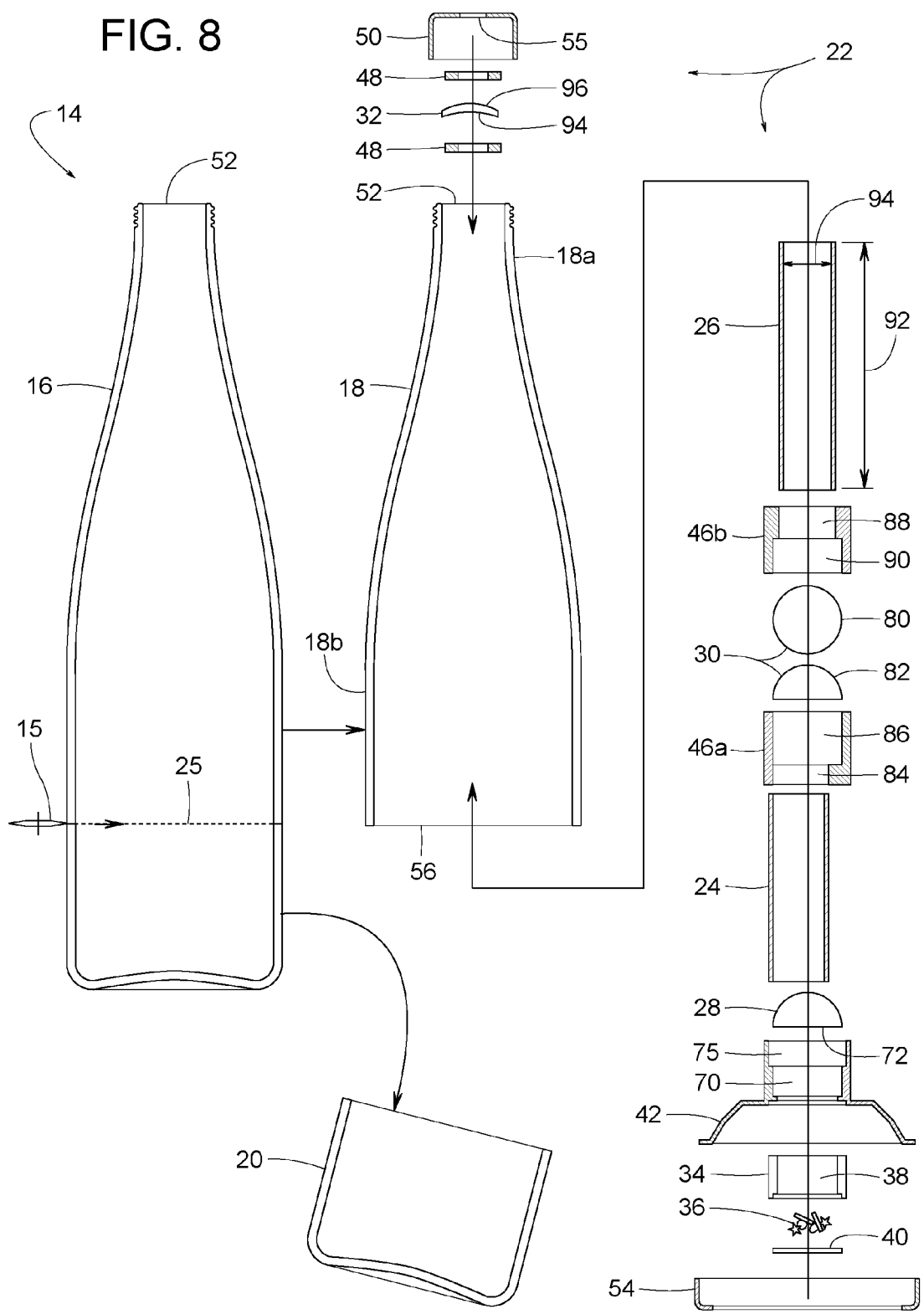
FIG. 8 is an exploded view illustrating an example kaleidoscope method for creating the kaleidoscope shown in FIG. 1.

FIGS. 1-6 show various views of an example kaleidoscope 10, FIG. 7 shows an example composite image 12 created by kaleidoscope 10, and FIG. 8 shows an example method 14 of producing kaleidoscope 10. In the illustrated example, kaleidoscope 10 is made by converting a conventional beverage bottle 16 (e.g., a bottle originally meant for wine, beer, champagne, other alcoholic beverages, non-alcoholic beverages, etc.) to a partial beverage bottle 18 by cutting off and removing a lower end 20 of bottle 16, as shown in FIG. 8. In some examples, a conventional known cutter 15 is used for cutting along a circumferential line 25 to separate lower end 20 from bottle 16. A kit of parts 22, also shown in FIG. 8, is then installed in a stacked arrangement within partial beverage 18 to create kaleidoscope 10.

In the illustrated example, the kit of parts 22 includes a first reflective tube 24, a second reflective tube 26, a first lens system 28, a second lens system 30, and a third lens system 32. Lens systems 28, 30 and 32 are made of any optically clear material, examples of which include, but are not limited to, glass, acrylic, polycarbonate, polystyrene, etc. Kit of parts 22 further includes an object container 34 (liquid or air filled), an assortment of viewable items 36 (e.g., small loose pieces of colorful glass, plastic, etc.) for installing inside an internal chamber 38 of object container 36, an end cap 40 for closing object container 34 after the assortment of viewable items 36 have been installed within internal chamber 38, a light-gathering reflector 42 for supporting first lens system 28 and for directing ambient light 44 into internal chamber 38, a lens housing 46 comprising a first sub-housing 46a and a second sub-housing 46b for containing second lens system 30, one or more rings 48 (e.g., a foam rubber washer) that are resiliently compressible for taking up any excess axial clearance of parts 22 within partial beverage bottle 18, a cap 50 (an eyepiece) attachable to an open top 52 of partial beverage bottle 18 has an aperture 55 through which image 12 is viewed, and a collar 54 attachable to an open bottom 56 of partial beverage bottle 18.

In some examples, at least some of viewable items 36, beverage bottle 16, and/or partial beverage bottle 18 are provided by a seller of the kit of parts 22. In some examples, at least some of viewable items 36, beverage bottle 16, and/or partial beverage bottle 18 are provided a user or buyer of the kit of parts 22, and the seller supplies the remaining parts needed for completing kaleidoscope 10. In the illustrated example, the specific stacked arrangement of parts 22, the geometric shapes of parts 22, and spatial orientations of parts 22 provide a dazzling composite image 12 comprising an intriguing multifaceted reflection 58 of viewable items 36 encircled by a glowing halo-like distortion 60 of viewable items 22, as shown in FIG. 7.

Figure 1:
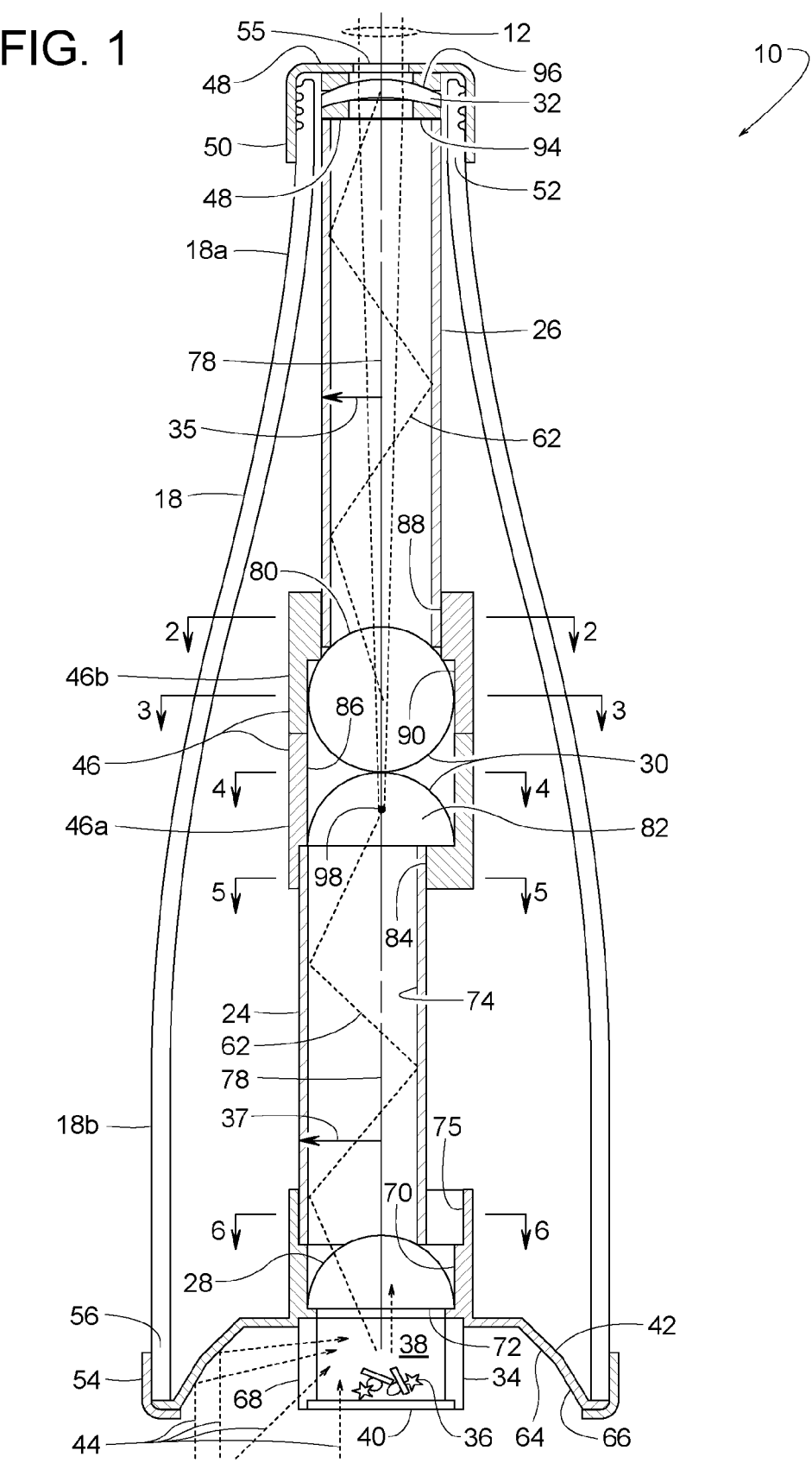
FIG. 1 is a cross-sectional front view taken along a longitudinal axis of an example kaleidoscope constructed in accordance with the teachings disclosed herein.

When partial beverage bottle 18 and parts 22 are assembled as shown in FIG. 1, a reflected line-of-sight 62 extends between object container 34 and aperture 55. In some examples, light-gathering reflector 42 has multiple reflective surfaces 64 and 66 lying at different angles (i.e., at different angles with reference to a longitudinal axis 78) to receive ambient light 44 approaching kaleidoscope 10 in a generally axial direction (generally parallel to axis 78) and reflecting the axially approaching light 44 in a radially inward direction through a radially outer wall 68 of object container 34. At least a portion of wall 68 is light permeable, i.e., transparent or translucent. In this example, the object container's entire wall 68 is transparent and so is end cap 40, so additional ambient light 44 can enter internal chamber 38 directly through wall 68 or end cap 40 without having to first reflect off of reflective surfaces 64 or 66. So, in the illustrated example, ambient light 44 enters chamber 38 from multiple radial and axial directions for maximum illumination of the assortment of viewable items 36. In some examples, end cap 40 is press-fitted, glued or otherwise fastened to a lower axial end of wall 68 after viewable items 36 are installed in chamber 38. In some examples, an upper axial end of wall 68 is press-fitted, glued or otherwise attached to reflector 42.

Light passing through and/or reflecting off of viewable items 36 passes through first lens system 28. The term, "lens system" refers to at least one lens. In this example, first lens system 28 comprises a single semispherical lens set within a receptacle 70 of reflector 42. A substantially flat surface 72 of first lens system 28 faces toward object container 34. In some examples, receptacle 70 and the remainder of reflector 42 start as separate pieces that are subsequently joined or connected, whereby reflector 42 is an assembly. In other examples reflector 42, including receptacle 70, is a seamless unitary piece.

Figure 5:
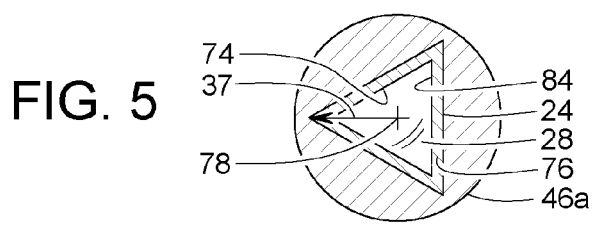
FIG. 5 is a cross-sectional view taken along line 5-5 of FIG. 1
Figure 6:
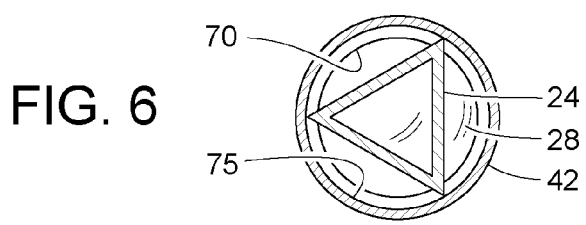
FIG. 6 is a cross-sectional view taken along line 6-6 of FIG. 1

Light passing from viewable items 36 through first lens system 28 passes through first reflective tube 24, which has a reflective inner surface 74. In some examples, first reflective tube 24 is cylindrical. In some examples, first reflective tube 24 is multifaceted (e.g., triangular, four sides, five sides, or any number of sides). In the illustrated example, first reflective tube 24 has a first cross-sectional area 76 (perpendicular to the tube's longitudinal axis 78) that is triangular, as shown in FIG. 5. The lower end of first reflective tube 24 fits within a cylindrical bore 74 in the upper section of reflector 42. As light reflects in a complicated pattern within first reflective tube 24, the triangular, multi-faceted reflective inner surface 74 helps create the multifaceted reflection 58 of composite image 12.

After passing through first reflective tube 24, light passes through second lens system 30. In this example, second lens system 30 comprises a first lens 80 and a second lens 82. First lens 80 is substantially spherical, and second lens 82 is substantially semispherical. Second lens system 30 is contained within lens housing 46. Lens housing 46 comprises sub-housings 46a and 46b, which are glued, fastened, taped or otherwise attached to each other after installing second lens system 30. In some examples, sub-housings 46a and 46b are made of polyvinyl chloride. In the illustrated example, sub-housing 46a has a triangular opening 84 for receiving first reflective tube 24 and a cylindrical cavity 86 for receiving second lens 82. Sub-housing 46b has a cylindrical cavity 90 for receiving first lens 80 and a cylindrical opening 88 for receiving second reflective tube 26.

Figure 2:
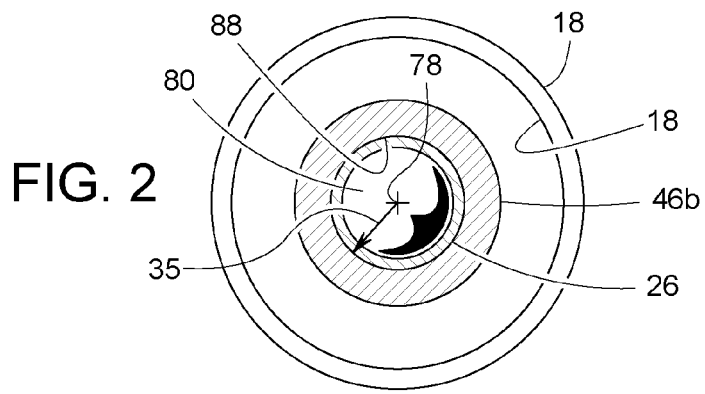
FIG. 2 is a cross-sectional view taken along line 2-2 of FIG. 1
Figure 3:
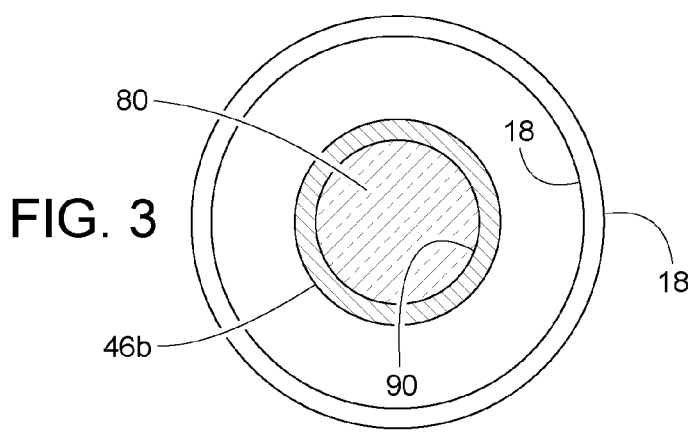
FIG. 3 is a cross-sectional view taken along line 3-3 of FIG. 1
Figure 4:
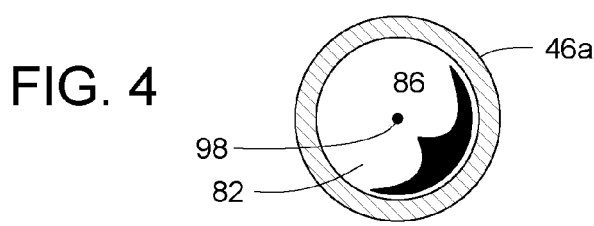
FIG. 4 is a cross-sectional view taken along line 4-4 of FIG. 1

From second lens system 30, light passes through second reflective tube 26. In some examples, second reflective tube 26 is multifaceted (e.g., triangular, four sides, five sides, or any number of sides). In the illustrated example, second reflective tube 26 is cylindrical, as shown in FIG. 2. Second reflective tube 26 has an axial length 92 that is greater than the length of first reflective tube 24. In some examples, second reflective tube's axial length 92 is at least four times greater than the tube's internal diameter 94 to create an angle of incidence that is sufficiently shallow to ensure multiple reflections within second reflective tube 26. This helps create the glowing halo-like distortion 60 that surrounds the multifaceted reflection 58 of composite image 12.

After passing through second reflective tube 26, light passes through third lens system 32. In some examples, third lens system 32 is a single lens having a concave surface 94 facing toward second lens system 30 and a convex surface 96 facing toward a person's eye viewing composite image 12. Other example shapes of third lens system 32 include, but are not limited to, plano-convex, double-convex, etc. In the illustrated example, the shape of third lens system 32 has a focal length that terminates at its focal point 98 in second lens 82. This provides clarity to the multifaceted reflection 58 without losing the visual impact of the halo-like distortion 60.

To complete the assembly of kaleidoscope 10, cap 50 is attached to the bottle's open top 52, collar 54 is attached to the bottle's open bottom 56, and the remainder of parts 22 are sandwiched between cap 50 and collar 54. In some examples, cap 50 and collar 54 are made of a flexible vinyl material and have inner diameters that press fit and cling to bottle 18. In other examples, cap 50 is made by drilling, punching or cutting aperture 55 into the bottle's original screw-on cap, and then screwing that cap onto the bottle's open top 52. To take up any excess axial clearance of parts 22 within partial beverage bottle 18, at least one ring 48 is held in compression somewhere between cap 50 and first reflective tube 24. In the illustrated example, third lens system 32 is sandwiched between two resiliently compressible rings 48.

In the illustrated example, partial bottle 18 comprises a relatively narrow neck 18a and a radially broader body 18b. In examples where a radial extension 35 of second reflective tube 26 is less than a radial extension 37 of first reflective tube 24, second reflective tube 26 is situated within the relatively narrow neck 18a while the radially larger first reflective tube 24 is situated within the broader body 18b. The term, "reflective" as it pertains to a tube (e.g., tubes 24 and 26) means that the inner surface of the tube is of a quality such that an image projected onto the inner surface at some predetermined angle produces a reflected image (e.g., mirror image, distorted image, blurred image, or combination thereof) of the projected image, wherein the reflected image is not merely randomly diffused light. The term, "axial" refers to a direction generally parallel axis 78. The term, "radial" refers to a direction perpendicular to the axial direction.

Figure 9:
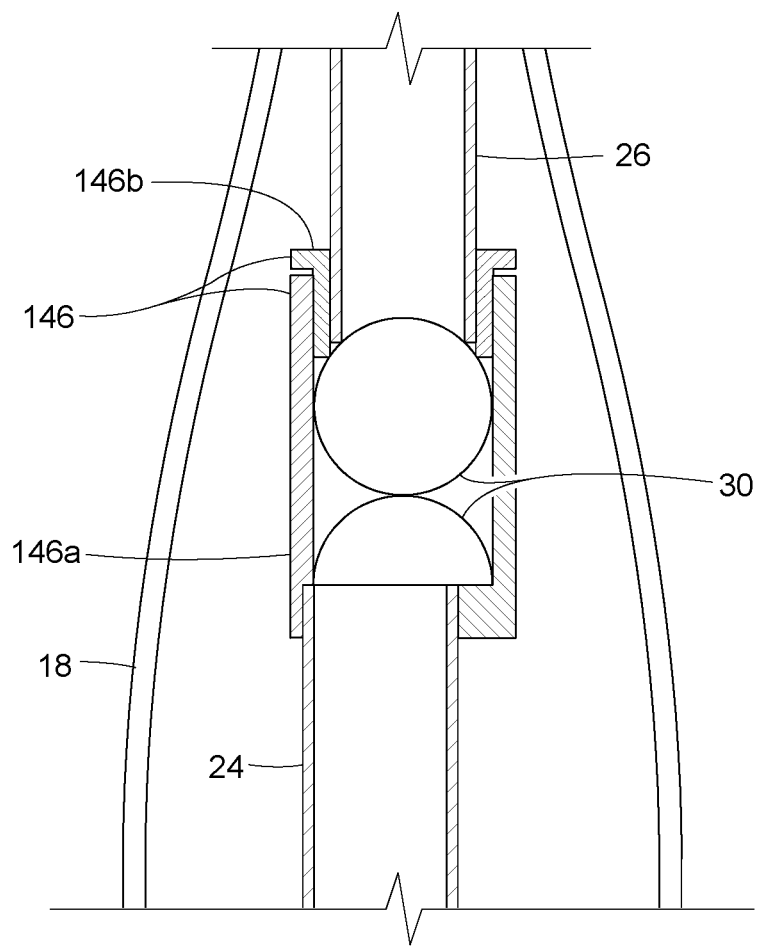
FIG. 9 is a cross-sectional front view of an alternate example lens housing constructed in accordance with the teachings disclosed herein.

Various modifications and alterations to this invention will become apparent to those of ordinary skill in the art without departing from the scope and spirit of this invention. FIG. 9, for instance, shows an alternate example lens housing 146 similar to lens housing 46. Lens housing 146, however, comprises an assembly of a first sub-housing 146a and a second sub-housing 146b for containing second lens system 30. In some examples, after installing second lens system 30 within first sub-housing 146a, second sub-housing 146b is glued to first sub-housing 146a. It should be understood that this invention is not intended to be unduly limited by the illustrative embodiments and examples set forth herein and that such examples and embodiments are presented by way of example only with the scope of the invention intended to be limited only by the claims set forth herein as follows.

The invention claimed is:

1. A kaleidoscope for viewing an assortment of viewable items, the kaleidoscope comprising:
    an object container having a container wall that is transparent or translucent, the object container defining an internal chamber for containing the assortment of viewable items;
    a first reflective tube extending along a longitudinal axis;
    a second reflective tube extending along the longitudinal axis;
    a first lens system between the first reflective tube and the object container;
    a second lens system between the first reflective tube and the second reflective tube;
    a third lens system, the second reflective tube being between the third lens system and the second lens system; and
    a reflected line-of-sight extending sequentially from the third lens system, through the second reflective tube, through the second lens system, through the first lens system, and into the internal chamber of the object container.

2. The kaleidoscope of claim 1, wherein the first reflective tube has a first cross-sectional area perpendicular to the longitudinal axis, the second reflective tube has a second cross-sectional area perpendicular to the longitudinal axis, and the first cross-sectional area is shaped differently than the second cross-sectional area.

3. The kaleidoscope of claim 1, wherein one of the first reflective tube and the second reflective tube is multifaceted, and one of the first reflective tube and the second reflective tube is substantially cylindrical.

4. The kaleidoscope of claim 1, wherein the second reflective tube has an axial length and an internal diameter, and the axial length is at least four times greater than the internal diameter.

5. The kaleidoscope of claim 1, wherein the first reflective tube is shorter than the second reflective tube.

6. The kaleidoscope of claim 1, wherein the second lens system comprises a first lens and a second lens, the first lens is between the second lens and the second reflective tube, and the second lens is between the first lens and the first reflective tube.

7. The kaleidoscope of claim 1, wherein the second lens system comprises a first lens and a second lens, the first lens is between the second lens and the second reflective tube, the second lens is between the first lens and the first reflective tube, the first lens is substantially spherical, and the second lens is substantially semispherical.

8. The kaleidoscope of claim 1, wherein the second lens system comprises a first lens and a second lens, the first lens is between the second lens and the second reflective tube, the second lens is between the first lens and the first reflective tube, the first lens is substantially spherical, the second lens is substantially semispherical, and the third lens system has a focal length terminating within the second lens.

9. The kaleidoscope of claim 1, wherein the first lens system comprises a substantially semispherical lens with a substantially flat surface facing toward the object container.

10. The kaleidoscope of claim 1, further comprising:
a cap defining an aperture, the third lens system being between the cap and the second reflective tube; and
a ring that is resiliently compressible, the ring being held in compression somewhere between the cap and the first reflective tube.

11. The kaleidoscope of claim 1, further comprising:
a light-gathering reflector encircling the object container; and
a collar holding the light-gathering reflector in a fixed relationship with the first reflective tube.

12. The kaleidoscope of claim 1, further comprising;
a partial beverage bottle defining an open top and an open bottom;
a cap defining an aperture, the cap being attached to the open top of the partial beverage bottle, the third lens system being between the cap and the second reflective tube;
a light-gathering reflector encircling the object container; and
a collar fastening the light-gathering reflector to the open bottom of the partial beverage bottle.

13. The kaleidoscope of claim 12, wherein the collar comprises a vinyl material that clings to the open bottom of the partial beverage bottle.

14. The kaleidoscope of claim 1, further comprising a composite image created by light passing through the kaleidoscope, the composite image comprising a multifaceted reflection of the assortment of viewable items and a halo-like distortion of the assortment of viewable items, wherein the halo-like distortion generally encircles the multifaceted reflection.

15. A kaleidoscope for viewing an assortment of viewable items, the kaleidoscope comprising:

an object container having a container wall that is transparent or translucent, the object container defining an internal chamber for containing the assortment of viewable items;
a first reflective tube extending along a longitudinal axis, the first reflective tube having a first cross-sectional area perpendicular to the longitudinal axis, the first reflective tube being multifaceted;
a second reflective tube extending along the longitudinal axis, the second reflective tube having a second cross-sectional area perpendicular to the longitudinal axis, the second reflective tube being substantially cylindrical, the second reflective tube having an axial length and an internal diameter, the axial length being at least four times greater than the internal diameter, the second reflective tube being longer than the first reflective tube;
a first lens system between the first reflective tube and the object container, the first lens system comprising a substantially semispherical lens with a substantially flat surface facing toward the object container;
a second lens system between the first reflective tube and the second reflective tube, the second lens system comprises a first lens and a second lens, the first lens being between the second lens and the second reflective tube, the second lens being between the first lens and the first reflective tube, the first lens being substantially spherical, the second lens being substantially semispherical;
a third lens system, the second reflective tube being between the third lens system and the second lens system, the third lens system having a focal length terminating within the second lens, the third lens system having a concave surface facing toward the second reflective tube, the third lens system having a convex surface facing away from the second reflective tube;
a partial beverage bottle defining an open top and an open bottom;
a cap defining an aperture, the cap being attached to the open top of the partial beverage bottle, the third lens system being between the cap and the second reflective tube;
a ring that is resiliently compressible, the ring being held in compression somewhere between the cap and the first reflective tube;
a light-gathering reflector encircling the object container, the light-gathering reflector directing ambient light into the object container;
a collar fastening the light-gathering reflector to the open bottom of the partial beverage bottle, the collar comprising a vinyl material that clings to the open bottom of the partial beverage bottle;
a line-of-sight extending sequentially from the third lens system, through the second reflective tube, through the second lens system, through the first lens system, and into the internal chamber of the object container; and
a composite image created by light passing through the kaleidoscope, the composite image comprising a multifaceted reflection of the assortment of viewable items and a halo-like distortion of the assortment of viewable items, wherein the halo-like distortion generally encircles the multifaceted reflection.

16. A kaleidoscope method involving the use of at least one of an object container, an assortment of viewable items, a first reflective tube, a second reflective tube, a first lens system, a second lens system, a third lens system, a cap defining an aperture, a light-gathering reflector, a collar, and a beverage bottle having an upper end and a lower end, the kaleidoscope method comprising:

creating a partial beverage bottle by removing the lower end of the beverage bottle, the partial beverage bottle having an open bottom where the lower end had been prior to removing the lower end, the upper end of the beverage bottle now being part of the partial beverage bottle;

installing the assortment of viewable items in the object container;

placing the first lens system between the object container and the first reflective tube;

placing the second lens system between the first reflective tube and the second reflective tube;

placing the third lens system between the second reflective tube and the cap;

installing the first lens system, the second lens system, the third lens system, the first reflective tube and the second reflective tube inside of the partial beverage bottle;

attaching the cap to the upper end of the partial beverage bottle; and holding at least one of the light gathering reflector and the object container to the partial beverage bottle by attaching the collar to the open bottom of the partial beverage bottle.

17. The kaleidoscope method of claim 16, further comprising creating a composite image by transmitting light through the kaleidoscope, the composite image comprising a multifaceted reflection of the assortment of viewable items and a halo-like distortion of the assortment of viewable items, wherein the halo-like distortion generally encircles the multifaceted reflection.

18. The kaleidoscope method of claim 17, wherein the first reflective tube is multifaceted and the second reflective tube is substantially cylindrical.

19. The kaleidoscope method of claim 17, wherein the second reflective tube has an axial length and an internal diameter, and the axial length is at least four times greater than the internal diameter.

20. The kaleidoscope method of claim 17, wherein the first reflective tube is shorter than the second reflective tube.

* * * * *